Patented Nov. 3, 1942

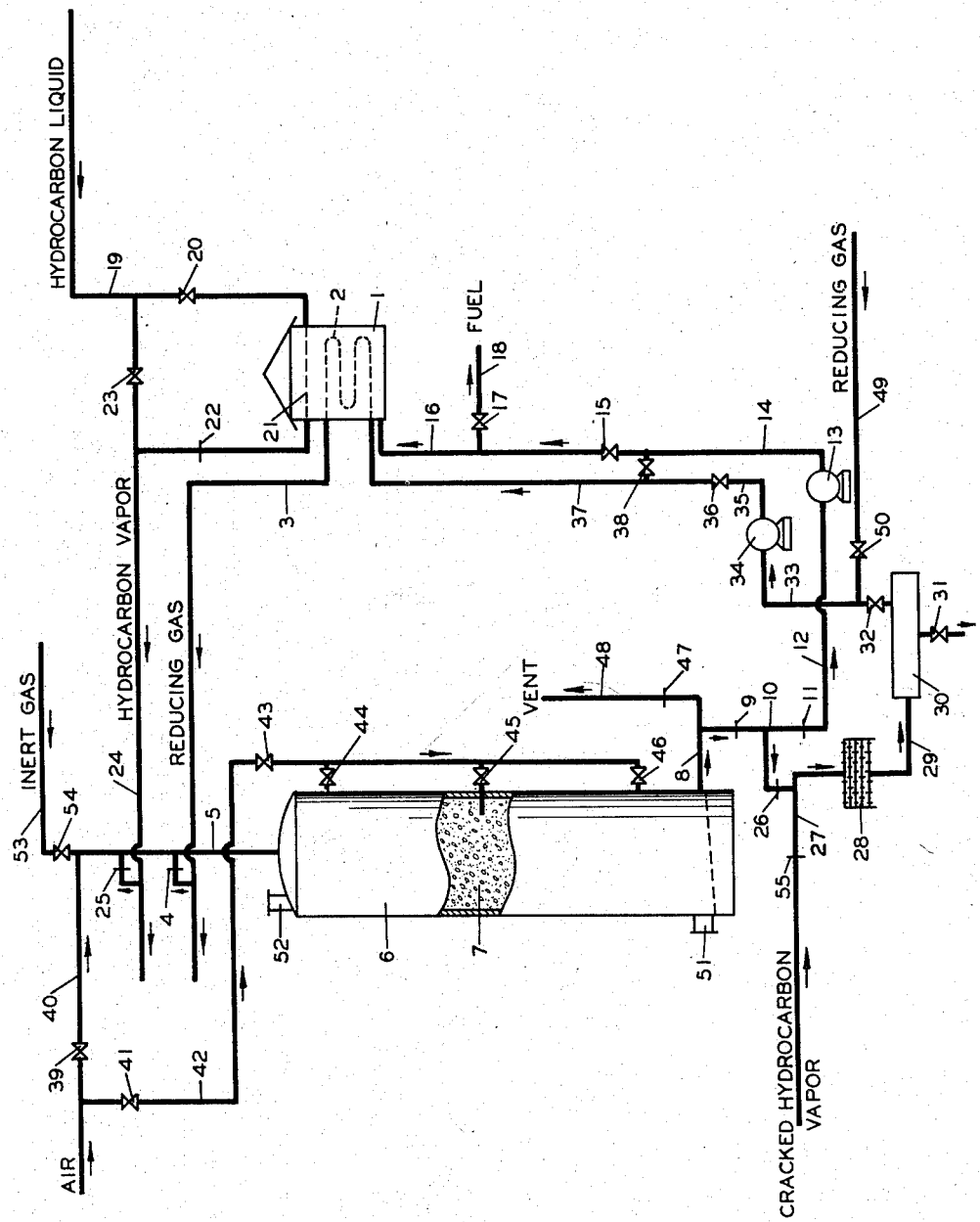

2,300,878

UNITED STATES PATENT OFFICE 2,300,878

TREATMENT OF NONFERROUS CATALYSTS

Harry E. Drennan and John C. Hillyer, Bartlesville, Okla., assignors to Phillips Petroleum Company, a corporation of Delaware Application August 19, 1940, Serial No. 353,307

8 Claims. (Cl. 252—236)

This invention relates to a process for the treatment of non-ferrous catalysts to effect the removal of ferrous impurities. More specifically it relates to a process for preparing solid adsorbent mineral ore materials of the non-ferrous metal oxide type for use as contact catalysts in the conversion of hydrocarbons. In a still more specific sense this invention relates to a treatment of natural non-ferrous metal oxide catalysts useful in the catalytic conversion of hydrocarbons to remove therefrom iron compounds present as a result of occlusion in the ore deposits.

Many of the catalytic conversion processes involving hydrocarbons and other organic reactants and including cracking, dehydrogenation, reforming, isomerization and the like are actively promoted by catalysts comprising the natural mineral ores of the metal oxide or silicate type. These catalysts because of their availability and rugged nature are thus highly important for catalytic processes either for use alone or supporting other catalysts of less suitable physical characteristics. Outstanding examples of such catalysts are the various clay-type minerals, caliche and silicate clays, feldspar, zeolites or green sands, brucite, bauxite and other naturally-occurring metal oxides.

There are certain applications in which mineral catalysts such as caliche clays, brucite and bauxite and the like are used satisfactorily without treatment for the removal of iron compounds. These are processes requiring temperatures below about 1000° F. including desulfurizing and/or treating gasoline hydrocarbons or higher-boiling oils to improve burning and anti-knock qualities. However, we have noted that at temperatures above 1000° F. the iron compounds present in a catalyst used in a reducing atmosphere such as hydrocarbon vapors are rapidly reduced to metallic iron and that excessive carbon deposition results from contact of said hydrocarbon vapors with metallic iron in the catalyst. Thus the iron compounds in a catalyst are in a relatively inactive form as regards carbon deposition until reduced, and processes operating below 1000° F. do not ordinarily involve sufficiently rapid reduction to cause difficulty.

When convertive reactions involving organic reactants, such as the cracking of hydrocarbons, dehydrogenation of normally gaseous hydrocarbons and dehydrogenation or organic oxy-compounds, and the like, are carried out in the presence of mineral catalysts which contain iron compounds at temperatures above about 1000° F., the iron compounds in said catalysts are rapidly reduced to the metallic state and thus cause substantial decomposition of the organic material with the formation of prohibitively large quantities of carbon and hydrogen. These side reactions resulting in excessive carbon formation are very undesirable; they materially decrease the yield of the desired product or products, and when the iron content of a catalyst is high, sufficient carbon may be deposited in the pores and on the surface of the catalyst to render it inactive in a relatively short time, requiring frequent regeneration by burning out the carbonaceous deposits.

Many of the non-ferrous run-of-mine ores contain considerable amounts of iron, mostly in the form of the oxide or sulfide or other compounds. Some of the iron compounds may be evenly distributed throughout the catalyst, but the largest portions may occur as nuggets of iron oxide or sulfide as is the case with bauxite ores. When the raw mineral catalyst is crushed some of the nuggets break out, while others are crushed and adhere to the catalyst particles. Gravity and magnetic separators are able to remove most of the nuggets and particles containing more iron than other mineral substances, but after the above separations are made, the catalyst material may contain more iron compounds than can be tolerated in high temperature catalytic processes.

Chemical methods for removing iron compounds have been proposed but they are expensive and have the disadvantage of removing desirable constituents along with the iron compounds. Chemical treatment may also effect adversely the physical properties of the catalyst by altering surface characteristics, or by forming compounds which will catalyze undesirable reactions. Various methods of treatment to inhibit the influence exerted by metallic iron at high temperatures have been suggested as treating the catalyst with compounds of sulfur, phosphorous, tellurium, boron, bismuth, and the like, to prevent excessive cracking of the hydrocarbon and carbon deposition on the catalyst surface. None of these methods have been entirely satisfactory. Some of the substances used poison the catalyst more or less and contaminate the product.

It is the object of the present invention to provide a practical process for removing most of the iron compounds from mineral catalysts of the type described. The iron compounds which can be removed by our process are those in a form reducible by carbon monoxide and/or hydrogen, or which can be disintegrated by deposition of carbon at high temperatures from a hydrocarbon vapor.

We have found that when catalytic material such as bauxite which contains from 3 to 10 per cent by weight of iron oxides is treated to reduce said iron oxides to the metallic state and further treated at high temperatures of 1100° to 1500° F. with a hydrocarbon which will crack extensively in the said temperature range that a relatively large quantity of carbon is deposited in and around the iron nuggets. When the reaction is complete the nuggets will have increased to several times their original size. After burning out the carbon and reoxidizing the iron the nuggets are converted to a mass of fluffy iron oxide powder which may be easily washed out of the catalyst material with water. It is known that under certain conditions iron oxide can be reduced with hydrogen or carbon monoxide and reoxidized many times with only slight disintegration but one treatment of a catalyst by our method is usually sufficient to disintegrate the iron oxide particles completely. Just how the disintegration proceeds is not definitely known but it is believed to be due to the expansion of the carbon deposited in the pores of the iron granule when the hydrocarbon contacts the metallic iron at high temperatures. The cracking of the hydrocarbon and the deposition of carbon continues until carbon has been deposited throughout the permeable iron structure.

Apparently when cracking takes place in the interstices of the metallic iron the carbon deposited therein expands and disintegrates the iron into particles of almost colloidal dimensions. It is the force of the expanding carbon which disintegrates the iron particles. In carrying out the experimental work on this process, quartz tubes filled with bauxite containing iron compounds have been shattered by the expanding carbon when the operating pressure was less than three pounds gauge. The diffusion and cracking continues until eventually all of the iron granules are permeated with carbon and the cracking influence of the iron is practically inhibited. At this stage generally enough carbon has been deposited on the catalyst to render it inactive, and to disintegrate all the iron granules.

Hydrocarbons suitable for the deposition of carbon in this process may vary over a wide range as to boiling point and physical properties from those gaseous at ordinary temperature to the liquids and solids, paraffin wax, gasoline, kerosine, gas oil, and heavy oils. The essential requirement is that the hydrocarbon vapor diffuse into the iron particle, crack, and deposit sufficient carbon therein to disintegrate the iron nuggets.

In accordance with the present invention, the raw mineral catalyst containing iron compounds is crushed and screened to desired size. It is then placed in a suitable tower or tube where it is treated with a reducing gas at high temperature to reduce the iron compounds to metallic iron, then treated with a suitable hydrocarbon vapor also at high temperature to deposit carbon in the catalyst to disintegrate the iron particles or nuggets. Then the hydrocarbon vapor flow is stopped, and the catalyst material is contacted with oxygen-containing gas at a temperature high enough to burn out the carbon and reoxidize the disintegrated metallic iron to fluffy iron oxide powder. When oxidation is complete the catalyst is removed from the reaction chamber and washed and screened to remove the iron oxide powder. The catalyst is then obtained substantially free of iron compounds.

It is desirable but not necessary to remove some of the iron compounds from the raw catalyst material by gravity or magnetic means, before removal by our process.

The invention will be more particularly described in connection with the accompanying drawing which shows one form of apparatus for carrying out the process, but it is to be understood that the said drawing is illustrative only and the invention is not to be limited thereto.

Figure 1 illustrates diagrammatically one type of apparatus for operation of our process for removing iron compounds from mineral catalyst by the successive steps of reduction, deposition of carbon, oxidation, and washing and screening of the final product.

Referring to Figure 1, the apparatus consists of a reaction chamber of suitable dimensions. Necessary pipes and valves are shown to illustrate the flow of reducing gas or hydrogen, hydrocarbon vapors, and air through the tower. In carrying out the reduction step, a reducing gas from an external source may enter through line 49, valve 50, line 33, blower 34, line 35, valve 36 and line 37 to the heater 1. Optionally, the reducing gas may be obtained from the cracking step of the process operating in another tower, entering by stop 55, line 27, cooler 28, line 29, accumulator 30 (where condensable liquids are removed) and valve 32 into line 33, etc., to the heater. The reducing gas is heated in coil 2 and passes through line 3, stop 4 and line 5 into the catalyst tower 6 and thence through the bed of catalyst 7. After passage through the catalyst, the gas passes through line 8, stop 9, line 10, stop 11 and line 12 to the blower 13. From the blower, the gas passes by line 14, valve 15 and line 16 to the heater where it is used for fuel. Alternately, any excess may pass from the system by valve 17 and line 18. Also any amount of the gas may be recycled through valve 38 into line 37. When the catalyst has been reduced, the flow of reducing gas is halted or diverted to another tower.

Following the reduction step, a hydrocarbon liquid or vapor entering by line 19, and valve 20 is vaporized and/or heated to desired temperature in coil 21 in heater 1 and the vapors pass through stop 22, line 24, stop 25 and line 5 into the catalyst tower wherein cracking occurs accompanied by the deposition of carbon in catalyst 7.

If vaporization is not required as in the case of a gaseous hydrocarbon, the gas may pass through valve 23 directly into line 24.

The temperature during the cracking step is regulated by the introduction of controlled amounts of air which enters by valve 39, valve 41, line 42, valve 43 and manifold valves 44, 45, and 46. The products of the cracking step leave the tower by line 8, stop 9, line 10, stop 26 and line 27 into cooler 28. From the cooler the stream passes through line 29 into accumulator 30 where condensate is separated and removed by line and valve 31. The gases rich in hydrogen may then pass by valve 32 and line 33 into the system and be used for reducing the iron compounds in a batch of raw catalyst in another tower.

When carbon deposition is complete, air in regulated amounts is introduced from the air supply line through valve 39, line 40 and line 5 into the catalyst tower. The temperature of the burning-out step is controlled by the volume of air introduced and an inert gas may be introduced with the air stream through line 53 and valve 54. When carbon has been burned out of the catalyst, the inert gas flow may be continued to cool the catalyst prior to its removal through manhole 51. The material removed may be conveyed by suitable means such as a belt conveyor to a screening apparatus where it is washed and screened. The washed and screened material substantially free of iron oxide particles may be dried and stored.

A highly satisfactory method of operating the process is to provide three towers with suitable piping as shown in Figure 1 so that the three steps of the process may be carried out simultaneously in the respective towers. Thus, a batch of raw catalyst may be reduced in one tower by means of the reducing gas formed by the carbon deposition step in a second tower while the carbon-filled catalyst in a third tower is being burned out. The treatment in the various steps may be controlled so that the time required for each will be equal and the process is effectively continuous.

The size and relative dimensions of the towers may be varied, depending on the volume of catalyst to be treated and upon the operating conditions used in treating same. Towers which have a ratio of diameter to length of from 1 to 2 to 1 to 5 have been found suitable. The towers may be lined with refractory material to withstand the high temperatures attained in the process.

The quantity of hydrocarbon required to coke the catalyst depends upon the hydrocarbon and on the flow rate used, and especially upon the temperature maintained in the catalyst bed. At temperatures of the order of 1000 to 1300° F. a gas oil, when charged at the rate of one third liquid volume per volume of catalyst per hour, will decompose rapidly, and deposit sufficient carbon in from one to two hours to disintegrate the iron present. The carbon deposition step may be judged complete when an increase of several pounds in the pressure drop through the catalyst bed is noted. The quantity of carbon necessary to be deposited to decompose the metallic iron granules has been found to be between three and five times the weight of reducible iron compounds in said catalyst. In the carbon deposition step it is desirable to operate at a high temperature so that most of the hydrocarbon will be converted to carbon and hydrogen, so that the gas from this step is then suitable for the reducing step. If the hydrocarbon used in the process is liquid it is desirable to vaporize it before using in the carbon deposition step. This may be accomplished as described. The saturated hydrocarbons gaseous at ordinary temperature decompose at higher temperatures than hydrocarbons liquid at atmospheric temperature. For this reason it is desirable to use liquid hydrocarbons that will decompose to carbon and hydrogen at the lower temperatures.

In the reduction step, the necessary heat may be supplied by heating the reducing gas in a furnace as described, prior to passage through the catalyst. A large volume of gas may be required to carry out the reduction at 1000° F. and if desired, higher temperatures up to 1300° F. may be employed. As described in the carbon deposition step a regulated amount of air may be admitted at different points in the catalyst bed to furnish all or a part of the heat required in this step. In treating bauxite catalyst containing from 3 to 6 per cent by weight of iron compounds 1 to 3 hours were required to reduce the iron at about 1100° F. and atmospheric pressure, while passing two liquid volumes of reducing gas per hour per volume of catalyst.

Under certain conditions the reduction step in this process may be omitted. When gaseous hydrocarbons such as those containing 2 to 4 carbon atoms are treated under dehydrogenating conditions at temperatures above 1050° F., sufficient hydrogen may be formed to reduce the iron compounds in a catalyst before said catalyst is covered over with carbon. The reduction and carbon deposition appear to proceed at about the same rate. In such cases, a catalyst may be used in a regular conversion operation and then when deactivated by carbon deposits, it may be burned out and iron oxide particles removed as a part of the initial regeneration step. An objection to the use of normally gaseous hydrocarbons in the reduction step is that a long time is required to disintegrate the iron, and more hydrocarbon is required. Also the lighter hydrocarbons are generally more expensive than the heavier ones.

The oxidation step is so highly exothermic that no trouble is experienced in obtaining temperatures within the desired range of 1000° to 1300° F. however, the temperature is easily controlled by regulating the flow of air or by dilution of the air stream with an inert gas.

High pressures are not required in any of the steps of the process. In general, pressures of atmospheric to 100 pounds gauge are adequate and insure flow of gases and vapors through the catalyst bed.

In the description of the apparatus for carrying out this invention, the word "stop" has been used, to denote a device used in place of a conventional valve. On all lines carrying hot gases, a flange connection is put in the place where a valve is needed. When it is desired to stop the flow through a pipe a metal disk is placed in the pipe, the plane of which is perpendicular to the center of the pipe and bolted up to the flange on the pipe, thereby blocking gas flow through the pipe.

We claim:

1. A process for removing iron compounds from non-ferrous catalysts containing the same, which comprises contacting the catalyst with a reducing gas at elevated temperatures to reduce substantially all the iron compounds to the metallic state, contacting the so treated catalyst with a hydrocarbon in vapor form under cracking conditions at temperatures of about 1,000 to 1,500° F. to deposit carbon throughout the metallic iron particles, then contacting the catalyst with an oxygen-containing gas at elevated temperatures to burn out the carbon and re-oxidize the iron to the oxide form, and separating the iron oxide formed thereby from the catalyst.

2. A process for removing iron compounds from non-ferrous mineral catalysts containing the same, which comprises contacting the catalyst with a reducing gas at elevated temperatures to reduce substantially all the iron compounds to the metallic state, contacting the so treated catalyst with a hydrocarbon in vapor form under cracking conditions at temperatures of about 1,000 to 1,500° F. to deposit carbon throughout the metallic iron particles, then contacting the catalyst with an oxygen-containing gas at elevated temperatures to burn out the carbon and re-oxidize the iron to the oxide form, and washing and screening the catalyst to remove the iron oxide therefrom and to recover the catalyst substantially free of iron compounds.

3. A process for removing iron compounds from bauxite mineral catalysts containing the same which comprises contacting said catalysts with a hydrogen-containing gas at elevated temperatures to reduce substantially all the iron compounds therein to the metallic state, contacting the so treated catalyst with a hydrocarbon vapor at temperatures in the range of about 1,000 to 1,500° F. to effect decomposition of said hydrocarbon to form carbon and allowing said carbon to deposit throughout the catalyst and thereby become associated with the reduced iron particles, contacting the catalyst with an oxygen-containing gas to burn out the carbon and re-oxidize the iron to iron oxide, and washing and screening the catalyst to separate the iron oxide and recover the catalyst substantially free of iron compounds.

4. A process for removing ferrous impurities from a non-ferrous mineral containing the same, which comprises contacting said mineral at elevated temperatures with a gas containing hydrogen to reduce the iron compounds therein to the metallic state, then contacting said mineral with vapors of a gas oil at temperatures in the range of about 1,000 to 1,300° F. and under cracking conditions of flow rate and pressure to deposit carbon therein in an amount greater than the weight of iron compounds present in the mineral, contacting the carbon containing mineral with an oxygen-containing gas to burn out the carbon and oxidizing the iron, washing and screening the treated mineral to separate the iron oxide therefrom, and recovering the mineral substantially free of iron compounds.

5. A process for removing ferrous impurities from non-ferrous mineral catalyst which comprises treating the catalyst with a hydrogen-containing gas at a temperature between 1000° and 1300° F. to reduce the iron compounds therein, treating the reduced catalyst with a hydrocarbon vapor at temperatures in excess of 1,000° F. and flow rates such that a large portion of the hydrocarbon vapor is decomposed to carbon and hydrogen over a period adequate to deposit carbon in an amount equivalent to 1 to 5 times the weight of iron compounds in said catalyst, then treating said catalyst with an oxygen-containing gas to burn out the carbon therefrom and oxidize the iron to iron oxide powder, cooling and processing the treated catalyst to remove the iron oxide powder therefrom and finally recovering the catalyst substantially free of iron compounds.

6. A process for treating a non-ferrous mineral catalyst comprising a metal oxide to remove ferrous impurities therefrom which comprises treating the catalyst with a hydrogen-containing gas at elevated temperature to reduce the iron compounds therein to metallic iron, subsequently treating the catalyst with a hydrocarbon vapor in the presence of an oxygen-containing gas introduced into the treating chamber in sufficient quantity to produce temperatures of about 1,000 to 1,500° F. in said chamber by partial combustion of the hydrocarbon vapors, whereby the remaining hydrocarbon vapors are decomposed with the deposition of substantial amounts of carbon within the catalyst, continuing the passage of hydrocarbon vapors until the weight of carbon deposited within the catalyst is greater than the weight of iron compounds originally present, then treating said catalyst with an oxygen-containing gas to burn out the carbon therefrom and oxidize the iron to iron oxide powder, removing the oxidized catalyst from the treating chamber, washing and screening to remove the iron oxide and recovering the catalyst substantially free of iron compounds.

7. A process for the removal of ferrous impurities from a non-ferrous metal oxide mineral catalyst, which comprises contacting said catalyst with a hydrocarbon containing 2 to 4 carbon atoms at a temperature above 1050° F. at flow rates such that a substantial portion of the hydrocarbon will be decomposed into carbon and hydrogen, and for a period of time sufficient to deposit with said catalyst a weight of carbon greater than the weight of reducible iron compounds in said catalyst, and reduce the ferrous impurities to iron, contacting the carbon-containing catalyst with an oxygen-containing gas at elevated temperatures to burn out the carbon and oxidize the iron to iron oxide powder, removing the oxidized catalyst from the reaction chamber, separating the iron oxide powder therefrom, and recovering the catalyst substantially free of iron compounds.

8. A process for the treatment of non-ferrous catalysts for the removal of ferrous impurities contained therein, which comprises contacting said catalysts with a hydrocarbon containing 2 to 4 carbon atoms at a temperature above 1,050° F. and at a flow rate suitable for decomposing a large portion of the hydrocarbon to carbon and hydrogen and reducing the ferrous impurities to iron, discontinuing the flow of hydrocarbon when a weight of carbon greater than the weight of reducible iron compounds is deposited within said catalyst, then contacting the catalyst with an oxygen-containing gas to burn out the carbon and oxidize the iron, and removing the iron oxide produced to obtain a catalyst substantially free of ferrous impurities.

HARRY E. DRENNAN.
JOHN C. HILLYER.